United States Patent [19]
Oaks

[11] Patent Number: 5,282,439
[45] Date of Patent: Feb. 1, 1994

[54] PET ENCLOSURE

[76] Inventor: Mary L. Oaks, 408 N. 6th, Lawton, Okla. 73507

[21] Appl. No.: 980,898

[22] Filed: Nov. 24, 1992

[51] Int. Cl.$^5$ ............................................. A01K 31/00
[52] U.S. Cl. .................................. 119/19; 119/28.5; 27/2
[58] Field of Search ............... 119/28.5, 19, 165, 168; 27/2, 4, 15

[56] References Cited

U.S. PATENT DOCUMENTS

| D. 203,032 | 11/1965 | Bell | D12/2 |
|---|---|---|---|
| 658,261 | 9/1900 | Herbold, Jr. | 27/4 |
| 2,050,675 | 8/1936 | Tanner | 27/4 |
| 2,238,982 | 4/1941 | Norton . | |
| 2,292,540 | 8/1942 | Norton . | |
| 2,659,344 | 11/1953 | Herbert . | |
| 3,490,417 | 1/1970 | Swinney | 119/19 |
| 3,552,356 | 1/1971 | Rosenthal . | |
| 3,618,568 | 11/1971 | Breeden . | |
| 3,791,347 | 2/1974 | Lovell | 119/19 |
| 3,989,008 | 11/1976 | Neumann . | |
| 3,997,948 | 12/1976 | Hicks et al. | 27/2 |
| 4,539,935 | 9/1985 | Meyer . | |
| 4,627,381 | 12/1986 | Reed et al. | 119/165 |
| 4,852,520 | 8/1989 | Goetz | 119/19 |
| 5,000,116 | 3/1991 | Fife et al. | 119/28.5 |
| 5,136,981 | 8/1992 | Barreto, III et al. | 119/28.5 |

FOREIGN PATENT DOCUMENTS 2016890  9/1979  United Kingdom ............... 119/28.5

*Primary Examiner*—John J. Wilson
*Assistant Examiner*—Todd E. Manahan
*Attorney, Agent, or Firm*—Dunlap, Codding & Lee

[57] ABSTRACT

A multi-purpose pet accessory comprises a bottom wall and a vertical wall with an access opening in the front. A panel sized to fit in the access opening is included. By inserting the panel in the access opening, the accessory is suitable for use as a whelping bed. Also included is a lid adapted to fit the bottom and the top of the enclosure. When the accessory is used as a pet bed or whelping bed, the lid is placed on the bottom of the enclosure, forming a decorative base. When the pet passes away, the accessory may be converted to a casket by closing the access opening with the panel and placing the lid on the top of the enclosure.

4 Claims, 3 Drawing Sheets

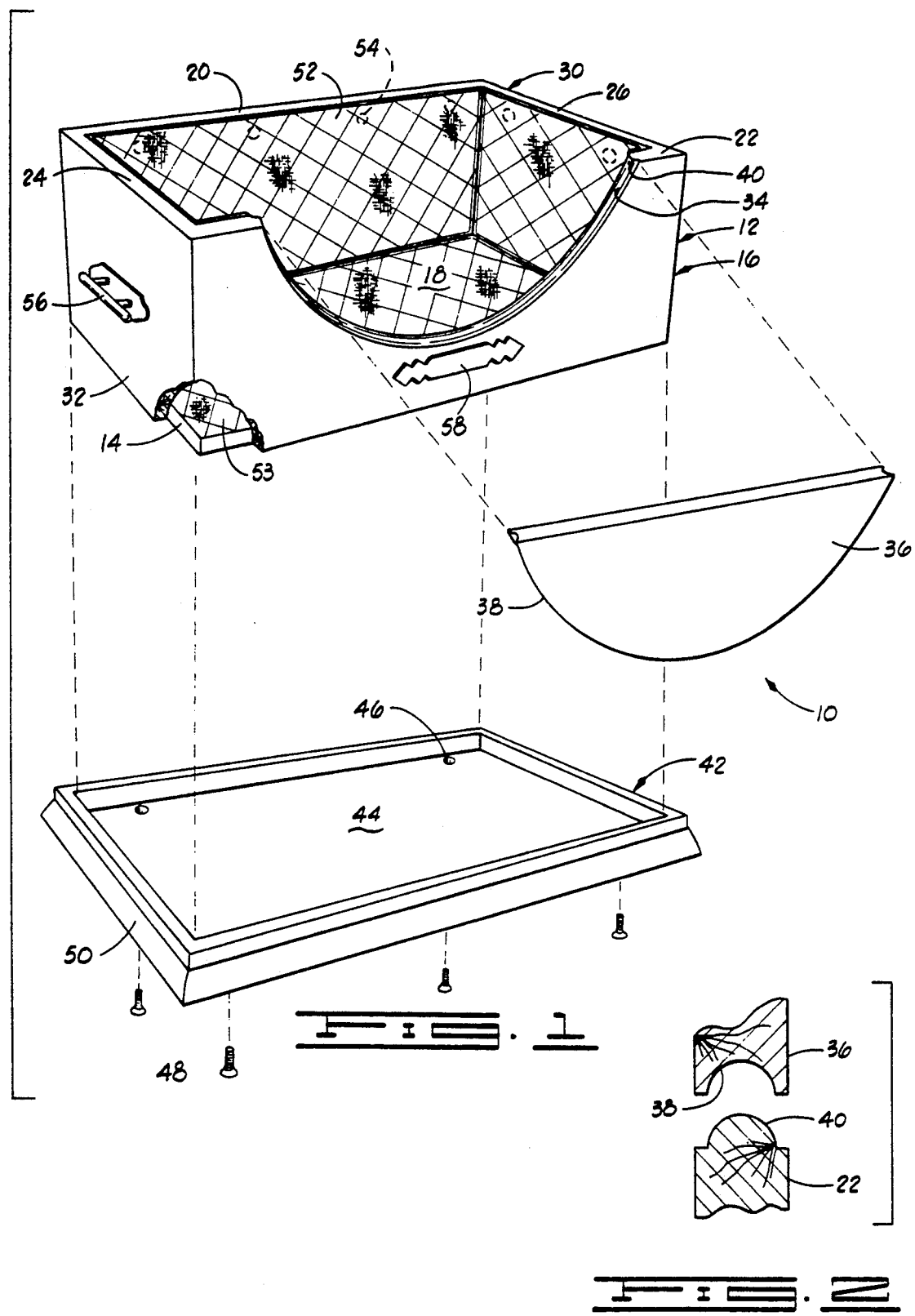

PET ENCLOSURE

FIELD OF THE INVENTION

The present invention relates generally to accessories for pets and, more particularly, to beds and other enclosures for pets.

SUMMARY OF THE INVENTION

The present invention is directed to a pet accessory. The accessory includes a body portion forming a chamber defined by a bottom wall and a vertical wall. The upper edge of the vertical wall defines the top of the body portion, and the plane defined by the top is substantially parallel to the plane defined by the bottom wall. The vertical wall includes a front portion having an access opening for providing access to the chamber. Also included is a panel adapted to be removably inserted in the access opening, and a lid which is adapted to fit over the top and the bottom of the body portion without substantially obstructing the access opening.

BRIEF DESCRIPTION OF THE DRAWINGS

FIG. 1 is an exploded frontal perspective view of the pet accessory of the present invention.

FIG. 2 is a fragmented, sectional view through the portion of the front wall of the body portion which forms an access opening and the removable panel which is insertable therein.

DETAILED DESCRIPTION OF THE PREFERRED EMBODIMENTS

Figure 3:
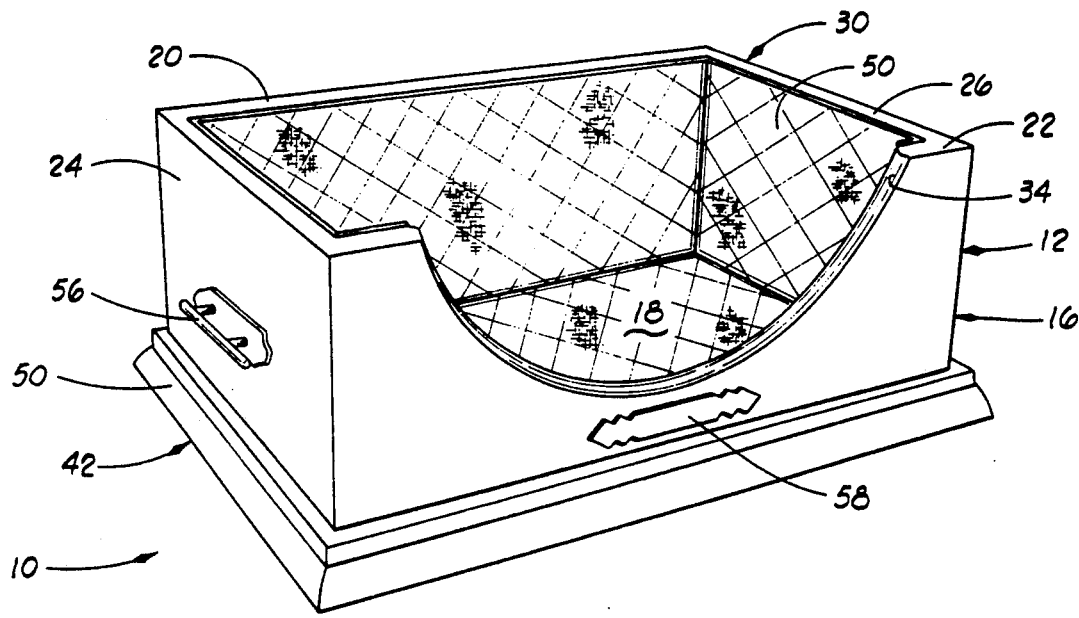
FIG. 3 is a frontal perspective view of the pet accessory of the present invention assembled to form a pet bed with an open top and an access opening in the front wall. The lid is placed on the bottom of the body portion.

Domestic cats and dogs are loyal companions and beloved family members in most American households. For the indoor pet, it is desirable to provide a bed area or house which the pet can consider his and his alone. It is to this cozy and familiar spot that the pet will retreat to sleep, to chew contentedly on a favorite bone, or to groom himself.

The present invention provides a pet accessory that can be utilized as a pet bed or a pet house which has an access opening in the front wall. When the need arises, this pet accessory can be converted into a whelping bed by inserting a panel in the access opening to prevent the escape of adventurous little puppies or kittens.

Finally, when the inevitable happens and the beloved pet passes away, the pet accessory of this invention can be converted quickly to a casket. Thus, the pet may be laid to his final rest in the same cozy and familiar bed that was his during life, and the pain of the pet's loss is not complicated by having to make last minute burial arrangements.

With reference now to the drawings in general and to FIG. 1 in particular there is shown therein a pet accessory in accordance with the present invention. The accessory is designated generally by the reference numeral 10.

The accessory 10 comprises a body portion 12 which is formed of a bottom wall 14 and a vertical wall 16 defining a chamber 18. Preferably, the body portion is rectangular in cross-section and as such has a back wall 20, a front wall 22, a first side wall 24 and a second side wall 26. The body portion 12 should be sized to provide a chamber 18 large enough to comfortably accommodate a selected pet, such as a dog or cat (not shown).

The upper edges of the vertical wall 16 define the top 30 of the body portion 12, and the lower edges of the side wall 16 defined the bottom 32 of the body portion. The plane defined by the top 30 of the body portion 12 is substantially parallel to the plane defined by the bottom wall 14.

The front portion of the vertical wall 16, which in the embodiment shown herein is the front wall 22, has an access opening 34 for providing access to the chamber 18. While the opening 34 may be any shape, a semicircular configuration is preferred. The opening 34 should be sized to allow the selected pet to enter and exit the chamber 18.

A panel 36 is included in the accessory 10. The panel 36 is adapted to be removably supported in the access opening 34. As best seen in FIG. 2, the edge of the panel 36 which mates with the front wall 22 is contoured to provide a groove 38. The edge in the front wall 22 which mates with the panel 36 is contoured to provide a ridge 40 which conforms to the groove 38 in the edge of the panel 36.

Returning to FIG. 1, the accessory 10 further comprises a lid 42. The inside of the lid 42 defines a recess 44. The recess 44 is sized to receive the top 30 and bottom 32 of the body portion 12. It should be noted that, for purposes yet to be described, the recess 44 in the lid 42 should be shallow enough that when the lid is placed on either the top 30 or the bottom 32 of the body portion 12, the access opening 34 will not be obstructed substantially. The lid 42 is pre-drilled with holes 46 sized to receive wood screws 48. The lid 42 may be provided with a decorative border such as the molding 50.

The body portion 12, the panel 36 and the lid 42 may be formed of any sturdy material. However, in the preferred embodiment, these components are formed of hardwood which preferably is stained and finished. The exterior of the components may be decorated, such as by carving or the application of decals or hand painted designs.

Referring still to FIG. 1, it is advantageous to include in the accessory 10 a liner 52. The liner 52 may be conveniently attached to the interior of the vertical wall 16 by snaps or like devices, one of which is designated by the reference number 54. The preferred liner 52 will be removable and made of washable material. Even more preferably, the liner 52 may be of quilted or padded material which will provide cushioned bedding for the pet.

Handles 56 may be attached to the outer surfaces of the first and second side walls 24 and 26. A name plate 58 may be attached to the front wall 22 to personalize the accessory 10.

With reference now to FIG. 3, the use of the accessory 10 will be described. As shown in FIG. 3, with the bottom 32 (FIG. 1) of the body portion 12 placed in the recess 44 (FIG. 1) of the lid 42 and with the panel 36 (FIG. 1) removed, the accessory 10 provides a sturdy and cozy bed for a pet which is easily accessed through the opening 34.

Figure 4:
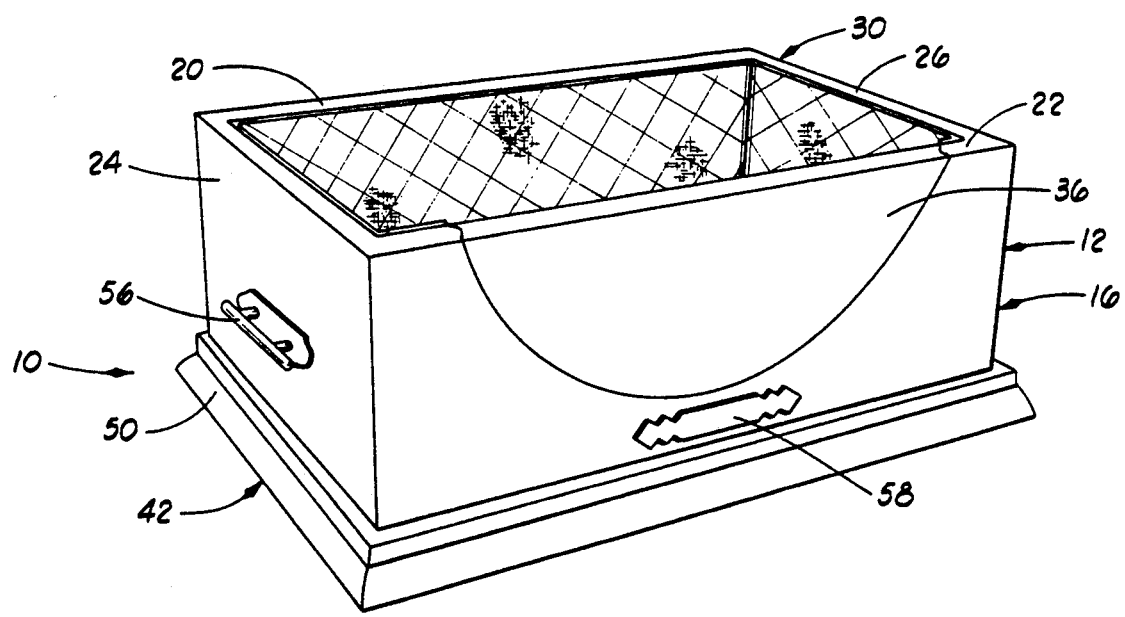
FIG. 4 is a frontal perspective view of the pet accessory of the present invention assembled to form a whelping bed with an open top and a panel inserted in the access opening to occlude the access opening.

As shown in FIG. 4, the panel 36 may be inserted to close the access opening 34 (FIG. 2). In this configuration, the accessory 10 forms an ideal whelping bed. The panel 36 prevents the escape of the tiny kittens or puppies, while the open top 30 permits the mother dog or cat to come and go as needed.

Figure 5:
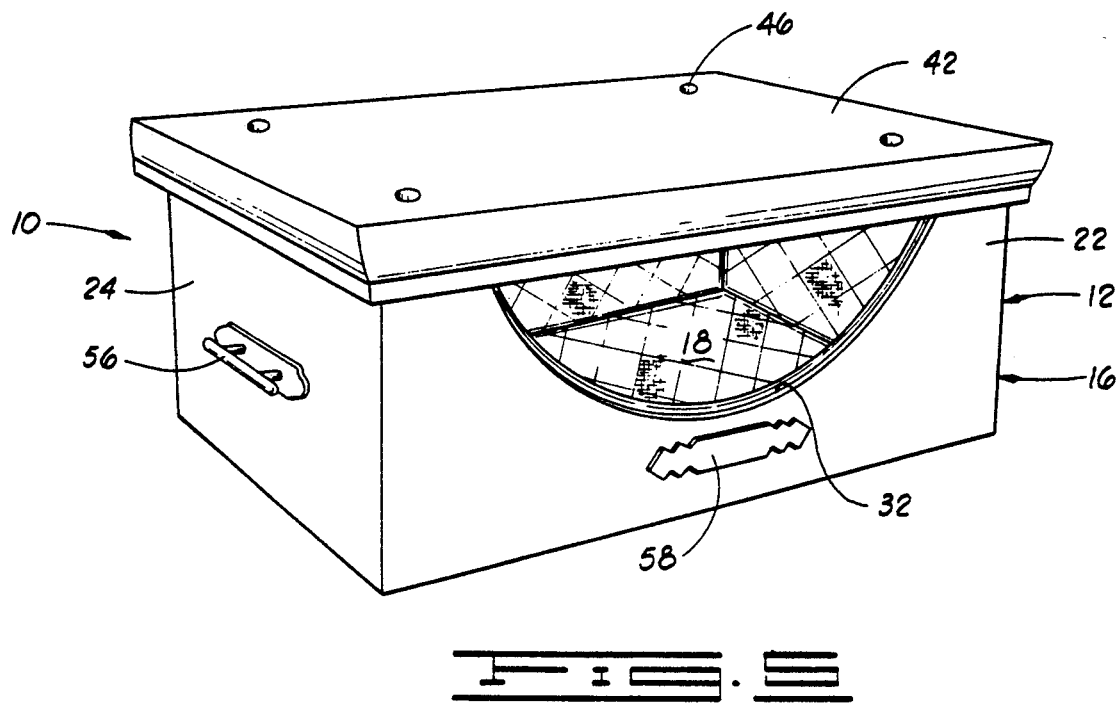
FIG. 5 is a frontal perspective view of the pet accessory of the present invention assembled to form a pet house with a closed top and an access opening in the front wall.

FIG. 5 depicts the use of the accessory 10 as a pet house. In this configuration, the panel 36 (FIG. 1) is removed and the lid 42 with the screws 48 removed is placed over the top 30 (FIGS. 3 and 4) of the body portion 12. This creates a dark and inviting enclosure which appeals to the den instinct in both cats and dogs.

Figure 6:
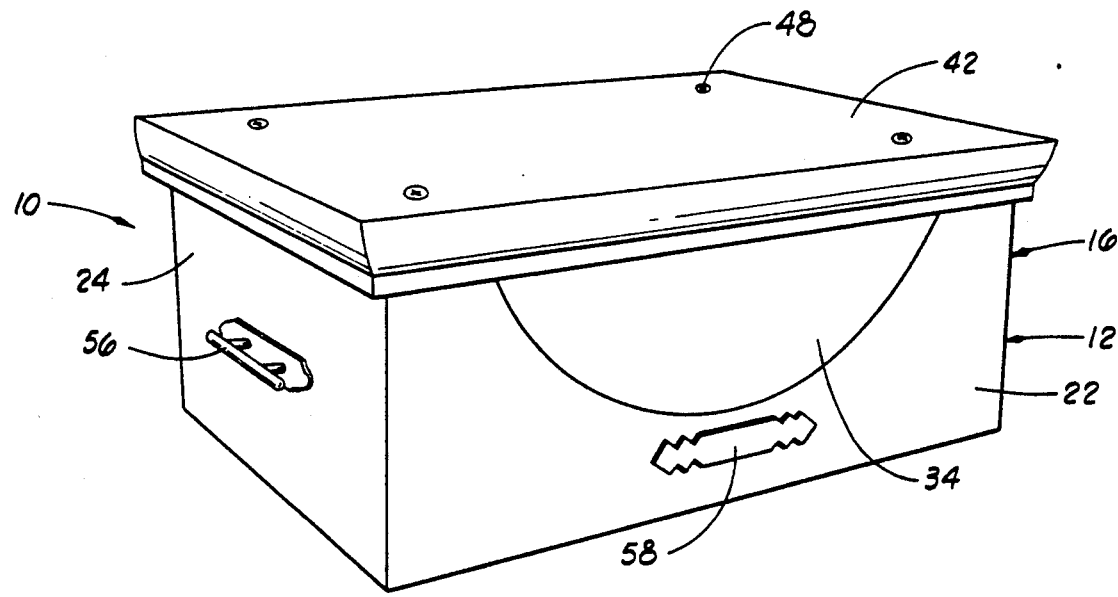
FIG. 6 is a frontal perspective view of the pet accessory of the present invention assembled to form a casket which is totally enclosed for burial of the pet.

Turning now to FIG. 6, the accessory 10 is shown therein with the panel 36 inserted to occlude the access opening 34 and the lid 42 secured on the top 30 (FIGS. 3 and 4) of the body portion 12. In this configuration, the accessory 10 provides a casket when the death of the pet occurs. The lid 42 is permanently attached to the body portion 12 by driving the screws 48 into the top edge of the side wall 16 (FIG. 1).

Changes may be made in the combination and arrangement of the various parts, elements, steps and procedures described herein without departing from the spirit and scope of the invention as defined in the following claims.

I claim:

1. A pet enclosure comprising:
   a body portion having a bottom wall and a vertical wall forming a chamber sized to accommodate a selected pet;
   wherein the upper edge of the vertical wall defines the top of the body portion;
   wherein the plane defined by the top is substantially parallel to the plane defined by the bottom wall;
   wherein the vertical wall includes a front portion having an access opening for providing access to the chamber;
   a panel adapted to be removably inserted in the access opening; and
   a lid defining a recess for receiving alternately the top and the bottom of the body portion without substantially obstructing the access opening.

2. The pet enclosure of claim 1 further comprising a removable liner made of washable material.

3. The pet enclosure of claim 1 wherein the lid is characterized by an ornamental border.

4. The pet enclosure of claim 1 wherein the body portion is substantially rectangular in cross-section.

* * * * *